US 8,194,402 B2

(12) United States Patent
Nagamura et al.

(10) Patent No.: US 8,194,402 B2
(45) Date of Patent: Jun. 5, 2012

(54) INFORMATION PROCESSING UNIT

(75) Inventors: Yoshiaki Nagamura, Osaka (JP);
Hitoshi Nakatani, Osaka (JP); Shintaro Tanaka, Osaka (JP); Haruka Kaneko, Kyoto (JP)

(73) Assignee: Panasonic Corporation, Osaka (JP)

( * ) Notice: Subject to any disclaimer, the term of this patent is extended or adjusted under 35 U.S.C. 154(b) by 130 days.

(21) Appl. No.: 12/547,089

(22) Filed: Aug. 25, 2009

(65) Prior Publication Data

US 2010/0046154 A1    Feb. 25, 2010

(30) Foreign Application Priority Data

Aug. 25, 2008  (JP) ................................ 2008-215657

(51) Int. Cl.
*H05K 7/14* (2006.01)
(52) U.S. Cl. ......... 361/679.21; 361/679.26; 361/679.02; 248/917
(58) Field of Classification Search ............. 361/679.59, 361/679.02, 679.01, 679.21, 679.22, 679.26, 361/679.27, 679.08, 679.09; 248/917–924
See application file for complete search history.

(56) References Cited

U.S. PATENT DOCUMENTS

| 5,552,957 | A | | 9/1996 | Brown et al. |
| 6,101,086 | A | * | 8/2000 | Kim et al. ................. 361/679.55 |
| 6,208,504 | B1 | * | 3/2001 | Cho et al. ................. 361/679.59 |
| 2010/0045431 | A1 | * | 2/2010 | Nagamura et al. ........... 340/5.82 |

FOREIGN PATENT DOCUMENTS

JP    8-087351 A    4/1996

* cited by examiner

*Primary Examiner* — Jinhee Lee
*Assistant Examiner* — Ingrid Wright
(74) *Attorney, Agent, or Firm* — Hamre, Schumann, Mueller & Larson, P.C.

(57) ABSTRACT

An information processing unit of the present invention includes: a housing that incorporates an information processor; a handle arranged on one side surface of the housing; and support members that are arranged on the one side surface of the housing to protrude and support the handle. The support members respectively are arranged continuously from the one side surface to a pair of other side surfaces adjacent to the one side surface in a direction in which the handle is bridged. Each of the support members has a bent portion between the one side surface and each of the other side surfaces. Thus, a stress applied between the first housing and a handle mechanism when, for example, a user carries a notebook PC holding a handle can be dispersed, so that the handle can be fixed to the first housing with improved strength.

6 Claims, 10 Drawing Sheets

INFORMATION PROCESSING UNIT

BACKGROUND OF THE INVENTION

1. Field of the Invention

The present invention relates to an information processing unit provided with a handle that can be held by a user.

2. Description of Related Art

Conventionally, as personal computers that emphasize portability, a notebook personal computer equipped with a handle has been commercialized. The handle is fixed to holding hardware. The holding hardware is fixed to a housing of the personal computer with screws.

JP 8(1996)-087351 A discloses a carrying case for housing a portable computer.

Hardware for holding a handle on a product is fastened on an outer case member of the product with screws. Such a structure only functions to withstand shock and load to/on the handle, and does not protect the outer case of the product when a user carries the personal computer using the handle. Further, based on the need for supporting the load on the handle, the hardware requires the outer case member to have a strong structure so as to bear a local stress.

Further, when the user puts the personal computer on a desk or the like after carrying the same holding the handle, a corner or the like of the personal computer often comes into contact with a surface on which the personal computer is put in the first place, so that the personal computer is likely to be scratched or broken. Hereinafter, the phenomenon in which the corner or the like of the personal computer comes into contact with the surface on which the personal computer is put in the first place is referred to as a "first contact phenomenon".

Further, in order to suppress damage to the product such as the scratch and the breakage due to the first contact, it is necessary to strengthen the structure for fastening the handle on the product, as well as to support the load on the handle as described above. Consequently, the personal computer becomes larger or heavier.

SUMMARY OF THE INVENTION

It is an object of the present invention to achieve an information processing unit that can be prevented from being broken due to the first contact when being carried by its handle, and can be realized with a thin-walled outer case member without a great increase in weight.

An information processing unit according to the present invention includes: a housing that incorporates an information processor; a handle arranged on one side surface of the housing, and support members that are arranged on the one side surface of the housing to protrude and support the handle. The support members respectively are arranged continuously from the one side surface to a pair of other side surfaces adjacent to the one side surface in a direction in which the handle is bridged Each of the support members has a bent portion between the one side surface and each of the other side surfaces.

According to the present invention, it becomes possible to provide an information processing unit that can be prevented from being broken due to the first contact when being carried by its handle, and can be realized with a thin-walled outer case member without a great increase in weight.

DETAILED DESCRIPTION OF THE INVENTION

An information processing unit according to the present invention includes: a housing that incorporates an information processor; a handle arranged on one side surface of the housing; and support members that are arranged on the one side surface of the housing to protrude and support the handle. The support members respectively are arranged continuously from the one side surface to a pair of other side surfaces adjacent to the one side surface in a direction in which the handle is bridged. Each of the support members has a bent portion between the one side surface and each of the other side surfaces.

Based on the above configuration, the information processing unit of the present invention may have the following aspects.

In the information processing unit according to the present invention, each of the support members can include a pair of outer case members. The housing can include a rib that protrudes from the one side surface in a direction in which the support members protrude. The rib can be formed integrally with the housing. The pair of outer case members can be arranged so as to sandwich the rib therebetween. With this configuration, even if the unit is subjected to a force in a torsional direction when, for example, a user carries the unit holding the handle, it is possible to make the support member less likely to be detached from the housing easily.

In the information processing unit according to the present invention, the rib can also protrude in the direction in which the handle is bridged in a portion on each of the other side surfaces on the one side surface side.

In the information processing unit according to the present invention, the outer case members can have a larger wall thickness at the bent portion than at other portions. With this configuration, even if a corner of the support member accidentally collides against a wall or the like, it is possible to prevent the support member from being broken easily.

The information processing unit according to the present invention further may include: a second housing provided with a display portion that displays an image based on information processed by the information processor; and a rotation axis about which the housing and the second housing are rotated, thereby assuming a first state in which the housing and the display portion are apart from each other or a second state in which the display portion is located dose to the housing. In the second state, the one side surface side and the bent portion of each of the support members may be arranged to protrude relative to a periphery of the second housing. With this configuration, it is possible to suppress damage to the rotation axis caused when the second housing is deformed due to the first contact.

(Embodiment)

[1. Configuration of Information Processing Unit]

Figure 1:
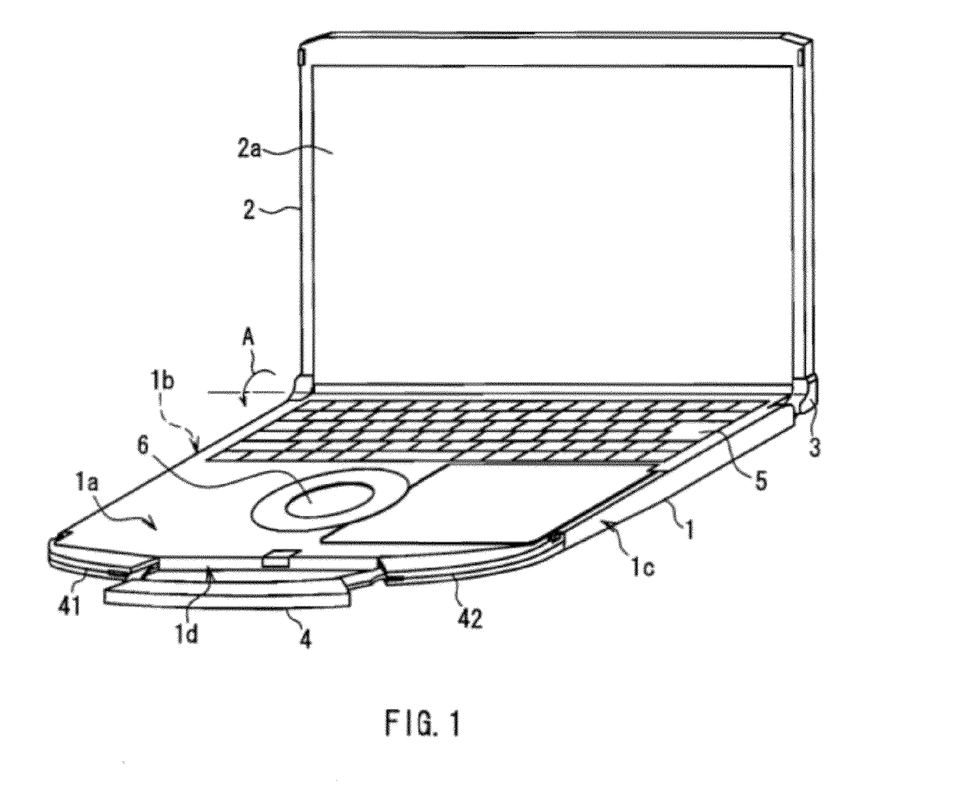
FIG. 1 is a perspective view showing an appearance of an information processing unit (first state) according to the present embodiment.
Figure 2:
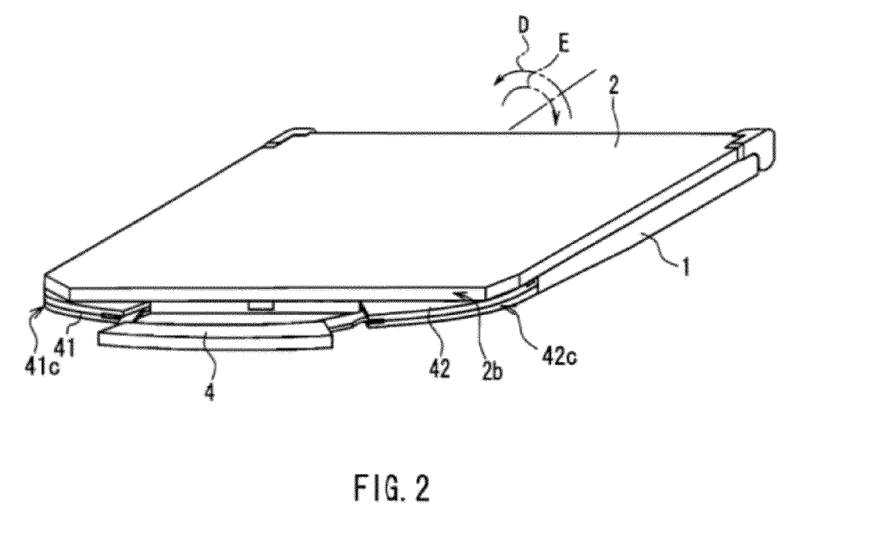
FIG. 2 is a perspective view showing an appearance of the information processing unit (second state) according to the present embodiment.
Figure 3:
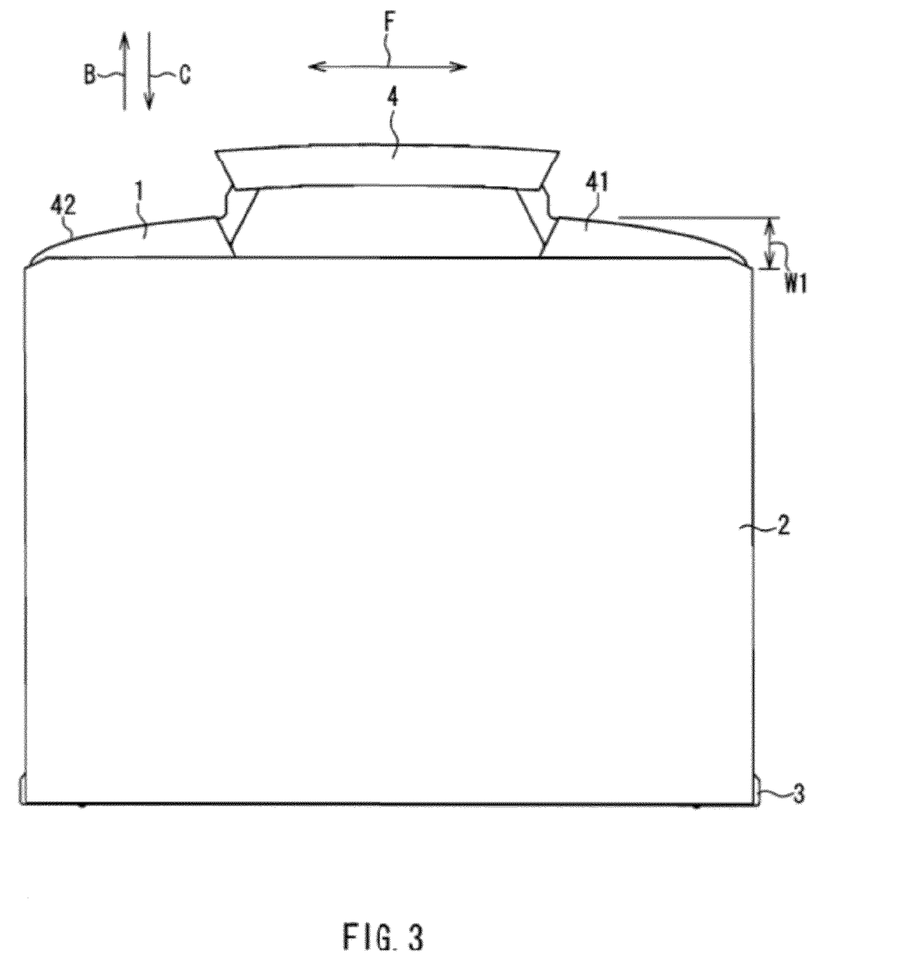
FIG. 3 is a plan view showing the appearance of the information processing unit (second state) according to the present embodiment.

FIG. 1 is a perspective view showing an appearance of an information processing unit of the present embodiment. FIG. 1 shows a first state of a notebook personal computer (hereinafter, referred to as a notebook PC) as an example of the information processing unit. FIG. 2 is a perspective view showing a second state of the notebook PC according to the present embodiment. FIG. 3 is a plan view of a first housing 1 in the information processing unit of the present embodiment. In the present embodiment, the notebook PC is given as an example of the information processing unit. However, any portable information processing units, such as a mobile telephone terminal and a portable medical instrument, are applicable as long as they include at least a handle that can be held by a user.

As shown in FIG. 1, the notebook PC includes the first housing 1 and a second housing 2. The first housing 1 incorporates a circuit board mounted with various electric elements, a hard disk drive, and the like. The second housing 2 includes a liquid crystal display 2a The first housing 1 and the second housing 2 are supported mutually rotatably by a hinge portion 3. The hinge portion 3 includes a shaft about which the first housing 1 and the second housing 2 are supported rotatably. When the second housing 2 is rotated from a position shown in FIG. 1 (first state) in a direction shown by an arrow A, it can move to a position shown in FIG. 2 (second state). Assuming that a surface of the first housing 1 opposed to the second housing 2 in the second state is defined as an "upper side", a keyboard 5 and a pointing device 6 are provided on an upper surface 1a of the first housing 1. The keyboard 5 enables an operation of inputting various characters. The pointing device 6 enables an operation of moving a cursor displayed on the liquid crystal display 2a to a desired position. Further, assuming that a handle 4 side in the second state is defined as a "front side", support members 41 and 42 for supporting the handle 4 are fixed to a side surface 1d of the first housing 1 on the front side (hereinafter, referred to as a front surface of the first housing). The handle 4 is bridged between the support members 41 and 42. The support members 41 and 42 respectively are provided continuously from the front surface 1d to side surfaces 1b and 1c adjacent to the front surface 1d in a direction in which the handle 4 is bridged. Since the first housing 1 includes the support members 41 and 42, it protrudes by a dimension W1 (see FIG. 3) relative to the second housing 2 when the notebook PC assumes the second state as shown in FIGS. 2 and 3. It should be noted that the "direction in which the handle 4 is bridged", which is a direction shown by an arrow F in FIG. 3, is the same as the longitudinal direction of the handle 4 in the present embodiment.

The handle 4 can be held by the user. The user holds the handle 4 so as to carry the notebook PC by hand. The handle 4 is supported by the support members 41 and 42 at its both ends in the longitudinal direction.

Figure 4:
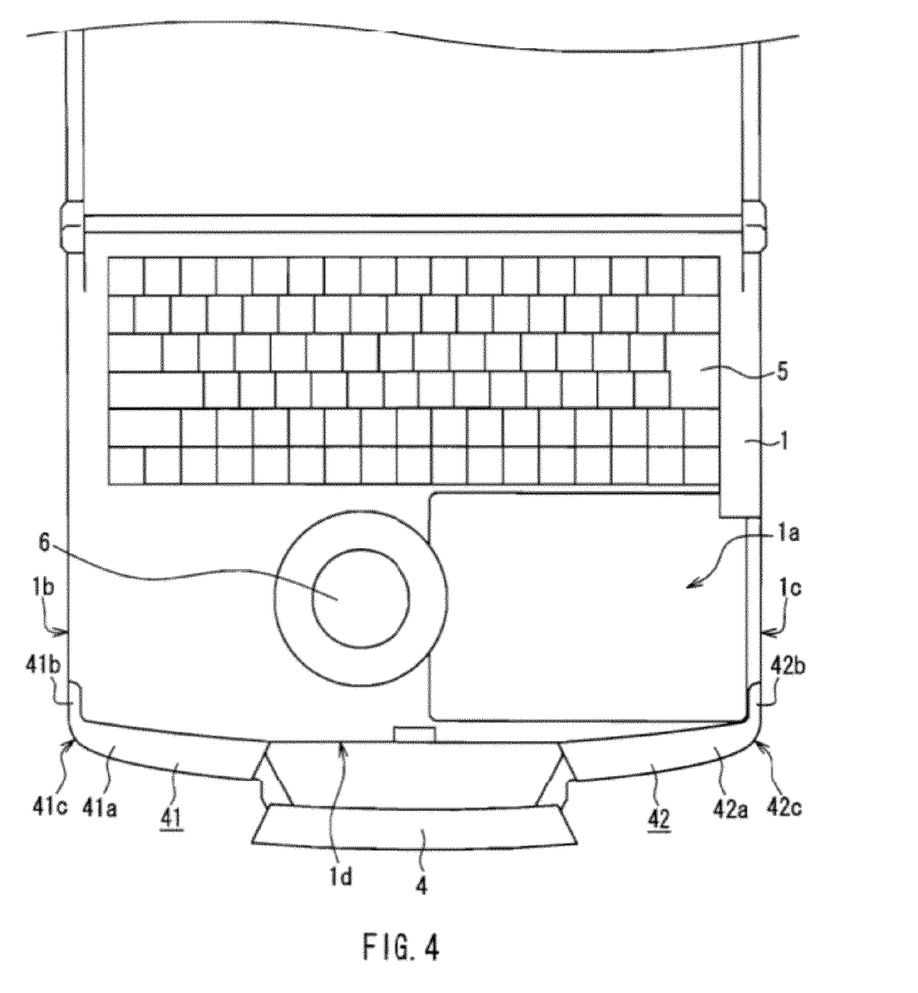
FIG. 4 is a plan view of a first housing of the information processing unit according to the present embodiment.

FIG. 4 is a plan view of the upper surface 1a side of the first housing 1. As shown in FIG. 4, the support member 41 includes fixing portions 41a and 41b. The fixing portion 41a is fixed to the front surface 1d side of the first housing 1. The fixing portion 41b is fixed to the side surface 1b side of the first housing 1. There is provided a corner 41c between the fixing portions 41a and 41b. The support member 42 includes fixing portions 42a and 42b. The fixing portion 42a is fixed to the front surface 1d side of the first housing 1. The fixing portion 42b is fixed to the side surface 1c side of the first housing 1. There is provided a corner 42c between the fixing portions 42a and 42b. In other words, each of the support members 41 and 42 is formed in a substantially L-shape so as to be arranged continuously along a corner of the first housing 1. The support members 41 and 42 preferably are made of a light metal such as aluminum or magnesium. In particular, magnesium or an alloy containing magnesium as a main component is desirable because it is hard and thus can enhance the strength of a handle mechanism.

[2. Configuration of Handle Mechanism]

Figure 5A:
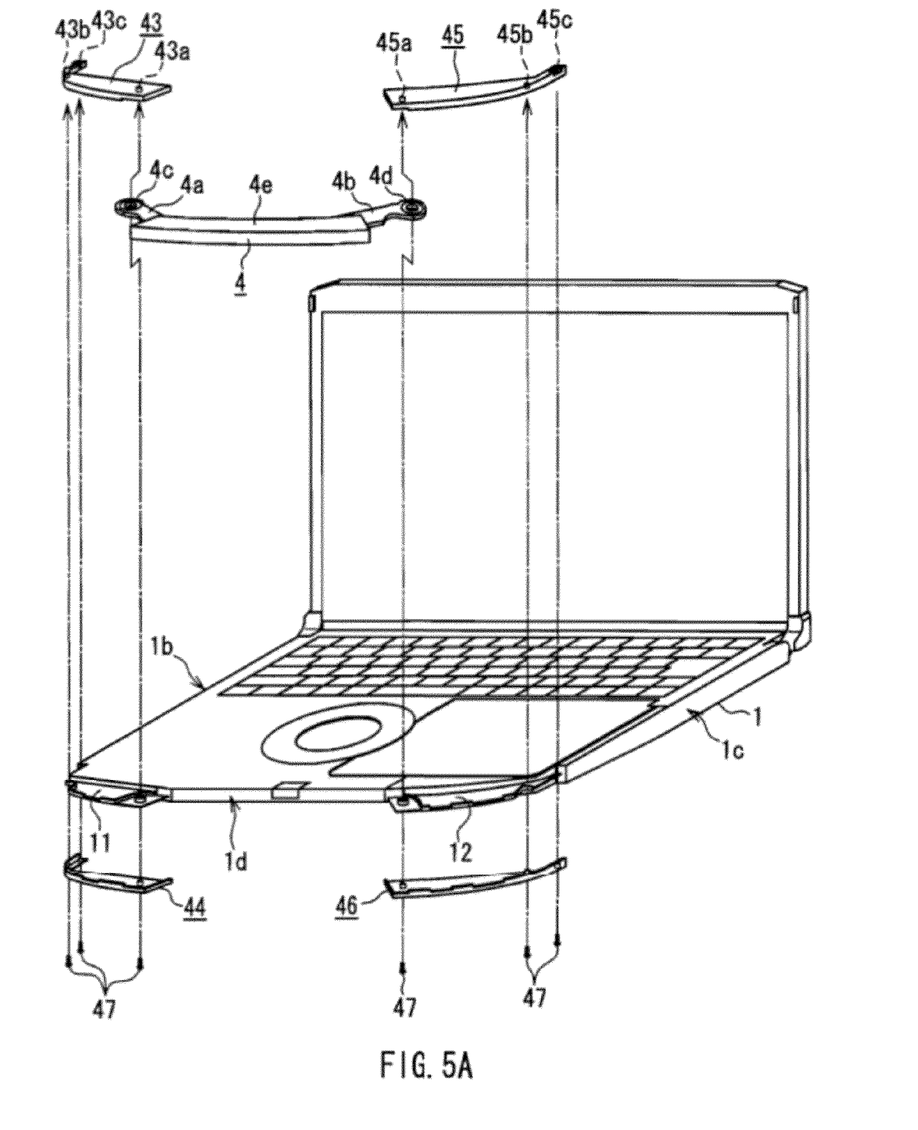
FIG. 5A is an exploded perspective view of the information processing unit according to the present embodiment.
Figure 5B:
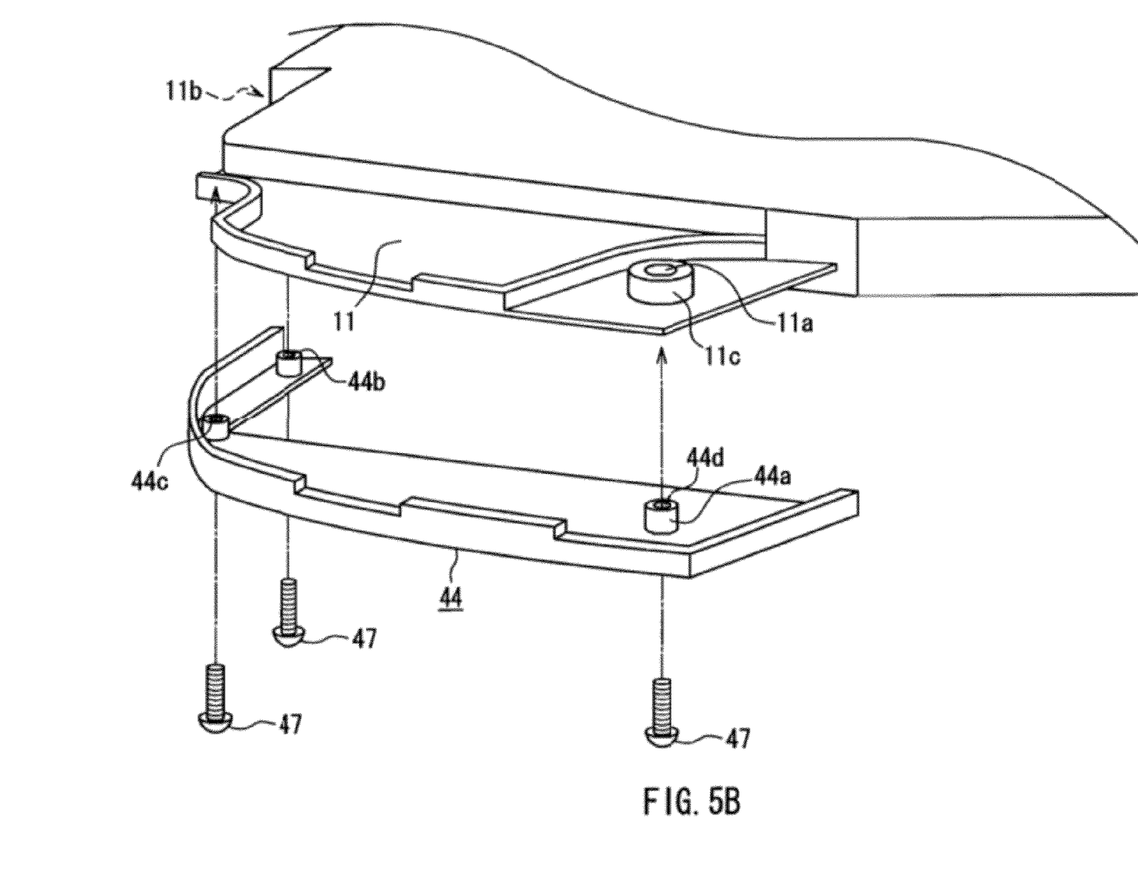
FIG. 5B is an enlarged perspective view of a vicinity of a rib 11 and an outer case member 44 in FIG. 5A.
Figure 5C:
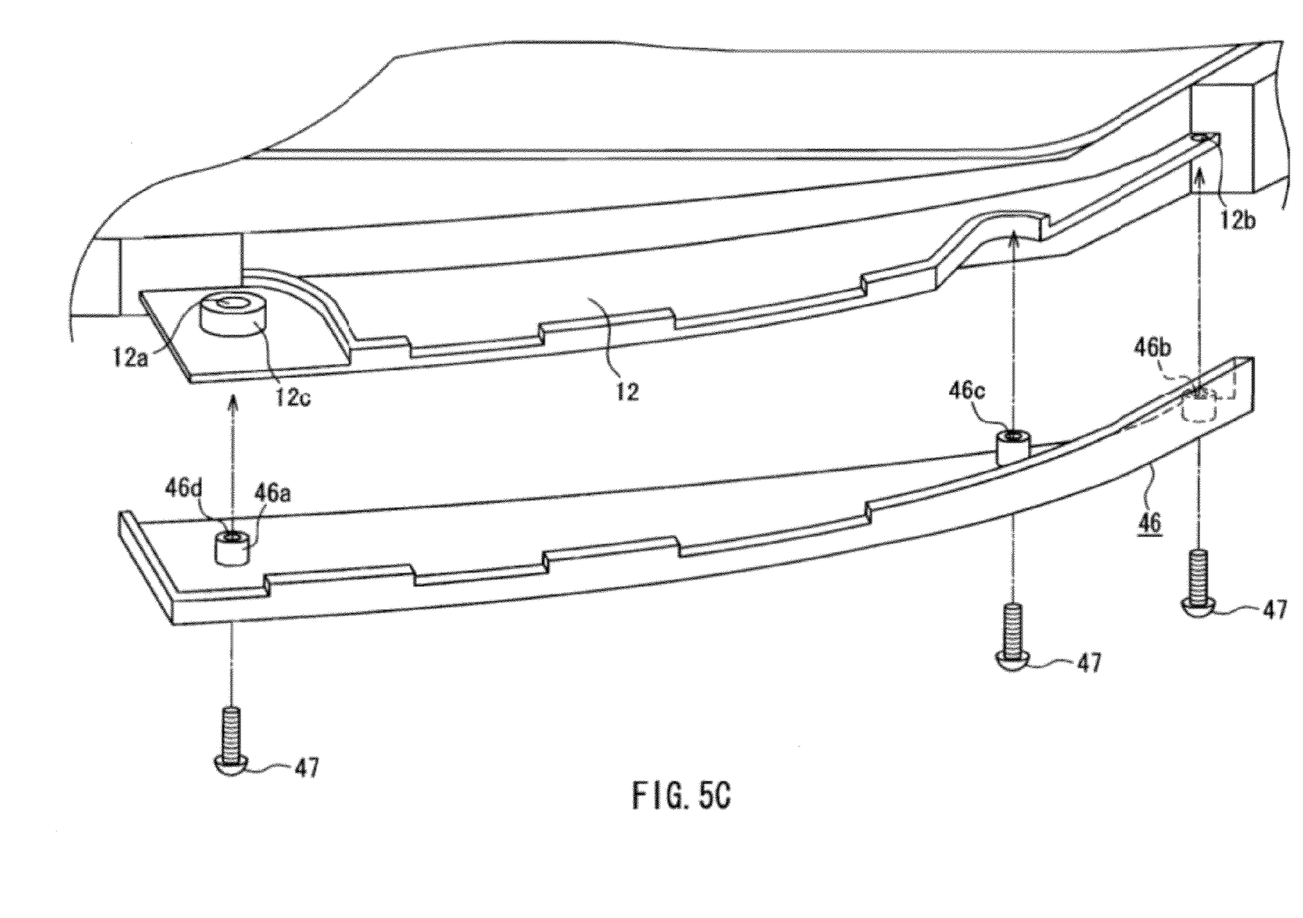
FIG. 5C is an enlarged perspective view of a vicinity of a rib 12 and an outer case member 46 in FIG. 5A.
Figure 5D:
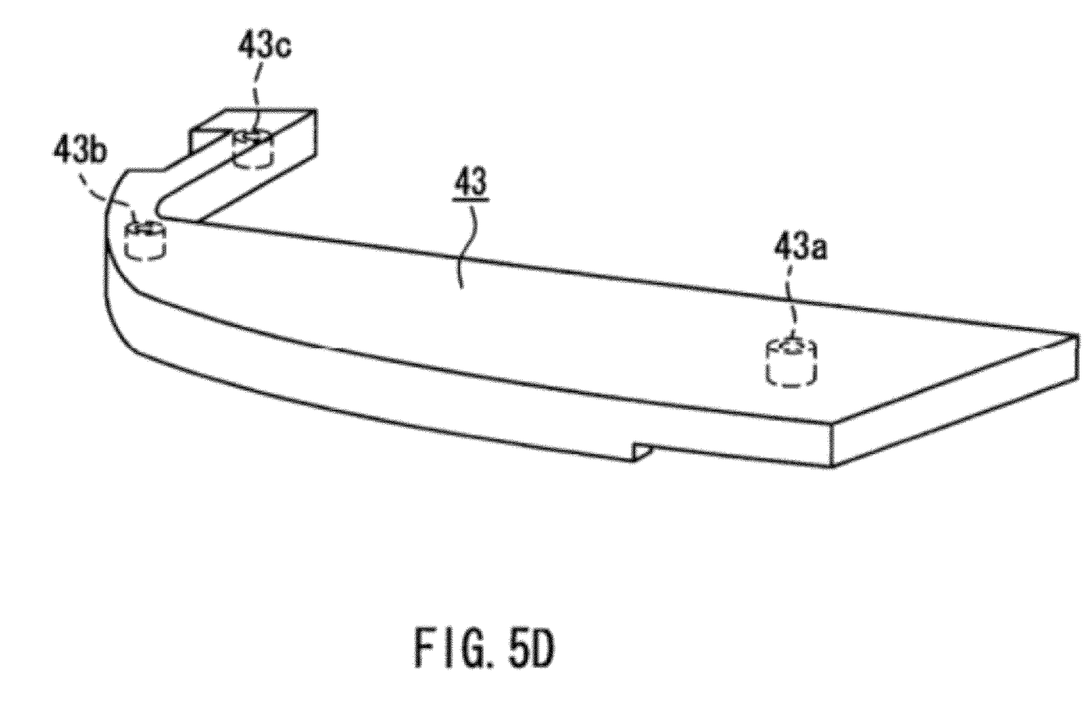
FIG. 5D is an enlarged perspective view of a vicinity of an outer case member 43 in FIG. 5A
Figure 5E:
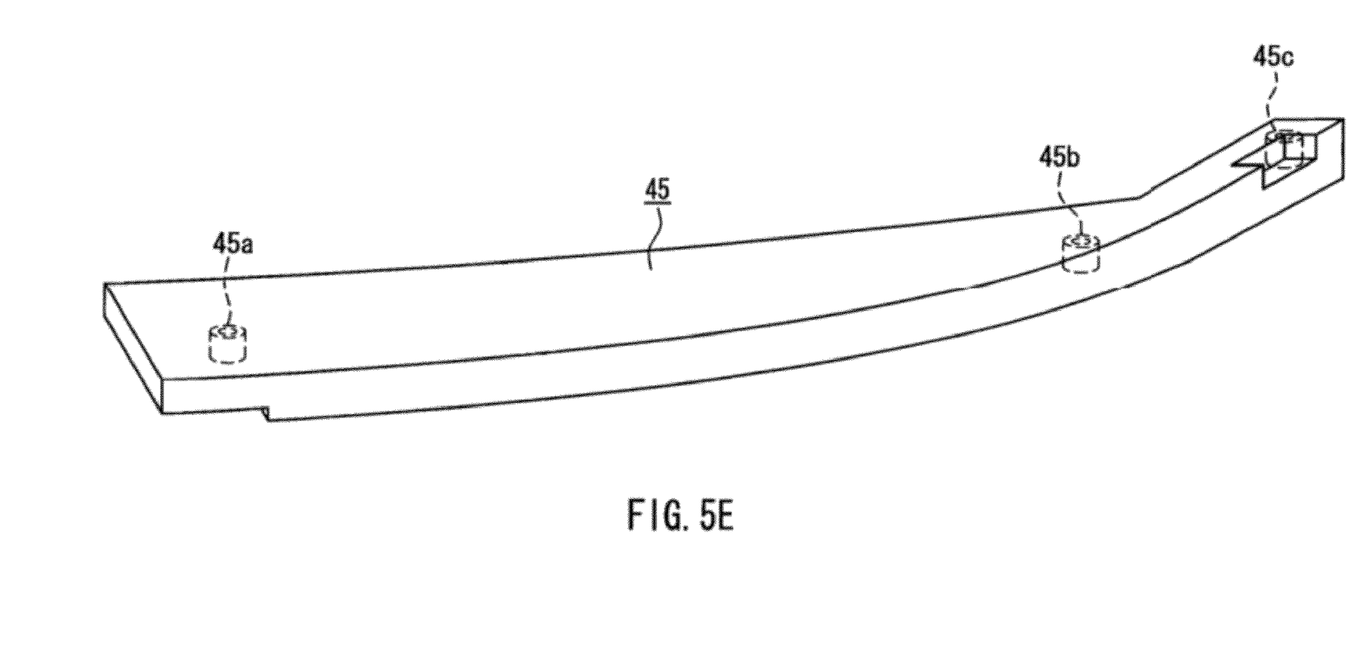
FIG. 5E is an enlarged perspective view of a vicinity of an outer case member 45 in FIG. 5A

FIG. 5A is an exploded perspective view of the handle mechanism of the present embodiment. As shown in FIG. 5A, the handle mechanism of the present embodiment includes the handle 4, outer case members 43 and 44, and outer case members 45 and 46. The handle mechanism is included in the first housing 1. The handle mechanism is supported on ribs 11 and 12. The rib 11 projects in a plate shape from apart of the side surface 1b and the front surface 1d. The rib 12 projects in a plate shape from a part of the side surface 1c and the front surface 1d. FIG. 5B is an enlarged perspective view of a vicinity of the rib 11 and the outer case member 44 below the rib 11 in FIG. 5A FIG. 5C is an enlarged perspective view of a vicinity of the rib 12 and the outer case member 46 below the rib 12 in FIG. 5A. FIG. 5D is an enlarged perspective view of a vicinity of the outer case member 43 above the rib 11 in FIG. 5A. FIG. 5E is an enlarged perspective view of a vicinity of the outer case member 45 above the rib 112 in FIG. 5A. As shown in FIG. 5B, the rib 11 is formed in a region where the support member 41 is fixed in the first housing 1. The rib 11 is formed continuously from the front surface 1d to the side surface 1b of the first housing 1. The rib 11 is provided integrally with the first housing 1. The rib 11 protrudes from the side surface 1b of the first housing 1 in the direction in which the handle 4 is bridged (direction shown by the arrow F in FIG. 3). The rib 11 includes holes 11a and 11b (the hole 11b is not shown).

As shown in FIG. 5C, the rib 12 is formed in a region where the support member 42 is fixed in the first housing 1. The rib 12 is formed continuously from the front surface 1d to the side surface 1c of the first housing 1. The rib 12 is provided integrally with the first housing 1. The rib 12 protrudes from the side surface 1c of the first housing 1 in the direction in which the handle 4 is bridged (direction shown by the arrow F in FIG. 3). The rib 12 includes holes 12a and 12b. Each of the holes 11b and 12b has an inner diameter that allows a screw 47 to be inserted therethrough. The hole 11a is formed in a cylindrical boss 11c formed on the rib 11. The hole 12a is formed in a cylindrical boss 12c formed on the rib 12. The hole 11a has an inner diameter that allows a boss 44a formed on the outer case member 44 to be fitted therein. The hole 12a has an inner diameter that allows a boss 46a formed on the outer case member 46 to be fitted therein.

As shown in FIG. 5A, the support member 41 includes the substantially L-shaped outer case members 43 and 44. The outer case member 43 is arranged on an upper surface side of the rib 11. The outer case member 44 is arranged on a lower surface side of the rib 11. In other words, the rib 11 is sandwiched between the outer case members 43 and 44. As shown in FIG. 5D, screw holes 43a, 43b, and 43c are formed on an inner surface (surface opposed to the upper surface of the rib 11) of the outer case member 43. The screw 47 can be screwed into each of the screw holes 43a, 43b, and 43c. As shown in FIG. 5B, holes 44b, 44c, and 44d are formed on an inner surface (surface opposed to the lower surface of the rib 11) of the outer case member 44. Each of the holes 44b, 44c, and 44d has an inner diameter that allows the screw 47 to be inserted therethrough. The hole 44d is formed in the cylindrical boss 44a.

As shown in FIG. 5A, the support member 42 includes the substantially L-shaped outer case members 45 and 46. The outer case member 45 is arranged on an upper surface side of the rib 12. The outer case member 46 is arranged on a lower surface side of the rib 12. In other words, the rib 12 is sandwiched between the outer case members 45 and 46. As shown in FIG. SE, screw holes 45a, 45b, and 45c are formed on an inner surface (surface opposed to the upper surface of the rib 12) of the outer case member 45. The screw 47 can be screwed into each of the screw holes 45a, 45b, and 45c. As shown in FIG. 5C, holes 46b, 46c, and 46d are formed on an inner surface (surface opposed to the lower surface of the rib 12) of the outer case member 46. Each of the holes 46b, 46c, and 46d has an inner diameter that allows the screw 47 to be inserted therethrough. The hole 46d is formed in the cylindrical boss 46a.

As shown in FIG. 5A, the handle 4 includes support portions 4a and 4b at ends of a holding portion 4e in the longitudinal direction. The support portion 4a includes a hole 4c having an inner diameter that allows the boss 11c to be fitted therein. The support portion 4b includes a hole 4d having an inner diameter that allows the boss 12c to be fitted therein.

During the assembly of the handle mechanism configured as described above, initially, the outer case member 43 is arranged on the upper surface side of the rib 11, and the outer case member 44 is arranged on the lower surface side of the rib 11. Further, the support portion 4a of the handle 4 is arranged between the rib 11 and the outer case member 43. At this time, the outer case members 43 and 44 are arranged so that the screw hole 43b and the hole 44c are placed so as to coincide with each other, the screw hole 43c, the hole 11b, and the hole 44b are placed so as to coincide with one another, and the screw hole 43a, the hole 4c, the hole 11a, and the hole 44d are placed so as to coincide with one another Then, the screw 47 is inserted through the hole 44c from a lower surface side of the outer case member 44 to be screwed into the screw hole 43b. The other screw 47 is inserted through the hole 44b and the hole 11b from the lower surface side of the outer case member 44 to be screwed into the screw hole 43c. Further, the other screw 47 is inserted through the hole 44d, the hole 11a, and the hole 4c from the lower surface side of the outer case member 44 to be screwed into the screw hole 43a As a result, the outer case members 43 and 44 and the support portion 4a side of the handle 4 can be fixed to the first housing 1.

The hole 4c formed in the support portion 4a is fitted loosely around an outer circumferential cylindrical surface of the boss 11c. Thus, the support portion 4a is supported rotatably about the boss 11c.

Thereafter, the outer case member 45 is arranged on the upper surface side of the rib 12, and the outer case member 46 is arranged on the lower surface side of the rib 12. Further, the support portion 4a of the handle 4 is arranged between the rib 12 and the outer case member 45. At this time, the outer case members 45 and 46 are arranged so that the screw hole 45b and the hole 46c are placed so as to coincide with each other, the screw hole 45c, the hole 12b, and the hole 46b are placed so as to coincide with one another, and the screw hole 45a, the hole 4d, the hole 12a, and the hole 46d are placed so as to coincide with one another.

Then, the screw 47 is inserted through the hole 46c from a lower surface side of the outer case member 46 to be screwed into the screw hole 45b. The other screw 47 is inserted through the hole 46b and the hole 12b from the lower surface side of the outer case member 46 to be screwed into the screw hole 45c. Further, the other screw 47 is inserted through the hole 46d, the hole 12a, and the hole 4d from the lower surface side of the outer case member 46 to be screwed into the screw hole 45a. As a result, the outer case members 45 and 46 and the support portion 4b side of the handle 4 can be fixed to the first housing 1.

The hole 4d formed in the support portion 4b is fitted loosely around an outer circumferential cylindrical surface of the boss 12c. Thus, the support portion 4b is supported rotatably about the boss 12c.

In the above-described manner, the handle mechanism can be fixed to the first housing 1 as shown in FIG. 4. In the present embodiment, the assembly of the support member 41 side is done first, followed by the assembly of the support member 42 side. However, the assembly of the support member 42 side may be done first, followed by the assembly of the support member 41 side. Alternatively, the assembly of the support member 41 side and the assembly of the support member 42 side may be done at the same time.

[3. What Occurs when Notebook PC is Subjected to Force]

Next, a description will be given of what occurs when the notebook PC of the present embodiment is subjected to a force.

In FIG. 3, when the user holds the handle 4 and lifts the notebook PC, the handle mechanism is subjected to a force in a direction shown by an arrow B and a force in a direction shown by an arrow C that is derived from the self-weight of the notebook PC, so that a stress occurs between the first housing 1 and the support members 41 and 42. In the present embodiment, since the support member 41 for holding the handle 4 is arranged continuously from the front surface 1d to the side surface 1b of the first housing 1, and the support member 42 is arranged continuously from the front surface 1d to the side surface 1c of the first housing 1 as shown in FIG. 4 and the like, the stress generated between the support members 41 and 42 and the first housing 1 can be dispersed. Therefore, the handle mechanism can be fixed with improved strength as compared with the conventional handle mechanism (mechanism fixed only to the front surface 1d of the first housing 1).

When the notebook PC is subjected to a force in a torsional direction (direction shown by an arrow D or E in FIG. 2) while the handle 4 is held by the user, a moment of inertia is produced on the notebook PC in its thickness direction. If the handle 4 is fixed only to the front surface 1d of the first housing 1 as in the conventional example, the fixing structure is required to be made larger for reinforcement, for example, so as to withstand the moment. In the present embodiment, the ribs 11 and 12 as part of the first housing 1 are sandwiched by the support members 41 and 42, respectively, and they are fixed with the screws 47 in a thickness direction of the first housing 1. Thus, torsion due to the moment is applied to the ribs 11 and 12 configured integrally with the first housing 1. Accordingly, even if the moment is produced in the thickness direction as described above, it is possible to make the support members 41 and 42 less likely to be detached from the first housing 1 or broken. Therefore, it is possible to fix the handle 4 with improved strength. Further, in the present embodiment, since the ribs 11 and 12 are formed integrally with the first housing 1, the handle 4 can be fixed to the first housing 1 with further improved strength.

Further, when the notebook PC accidentally collides against a wall or the like while the user carries the notebook PC holding the handle 4, a corner of the notebook PC tends to come into contact with the wall or the like first. In the present embodiment, the support members 41 and 42 are provided at the corners of the first housing 1. Thus, even if the notebook PC accidentally collides against the wall or the like, the collision impact can be received by the support members 41 and 42. Namely, the support members 41 and 42 absorb the collision impact, so that the impact can be made less likely to reach the first housing 1. Further, the support members 41 and 42 absorb the collision impact or may be broken under the collision impact, so that the corners of the first housing 1 become less likely to be deformed or broken. Even if the support members 41 and 42 are broken by the collision, the support members 41 and 42, which are separate from the first housing 1, can be replaced with new support members easily.

Further, when the notebook PC accidentally collides against the wall or the like while the user carries the notebook PC holding the handle 4, a corner of the notebook PC tends to come into contact with the wall or the like first. When the corners of the first housing 1 overlap corners of the second housing 2 while the notebook PC assumes the second state, the corner of the second housing 2 may come into contact with the wall or the like. In such a case, the second housing 2 is subjected to an impact force and deformed. The deformation may propagate to the hinge portion 3 to damage the same. The damage to the hinge portion 3 has an adverse effect on the rotation operations of the first housing 1 and the second housing 2. Further, if the hinge portion 3 is subjected to a large impact force, there occurs an irreversible deviation between the first housing 1 and the second housing 2. In order to avoid these, the notebook PC of the present embodiment includes the support members 41 and 42 in the first housing 1, and the first housing 1 side protrudes by the dimension W1 relative to the second housing 2 side as shown in FIG. 3. Thus, when the notebook PC accidentally collides against the wall or the like while the user carries the notebook PC holding the handle 4, the first housing 1 side collies against the wall or the like prior to the second housing 2 side. In particular, it is likely that the corner 41c of the support member 41 or the corner 42c of the support member 42 collide against the wall or the like. Accordingly, the support members 41 and 42 absorb a certain degree of the collision impact, so that the impact can be made less likely to reach the hinge portion 3. Therefore, it is possible to suppress the occurrence of an irreversible deviation between the first housing 1 and the second housing 2.

Figure 6:
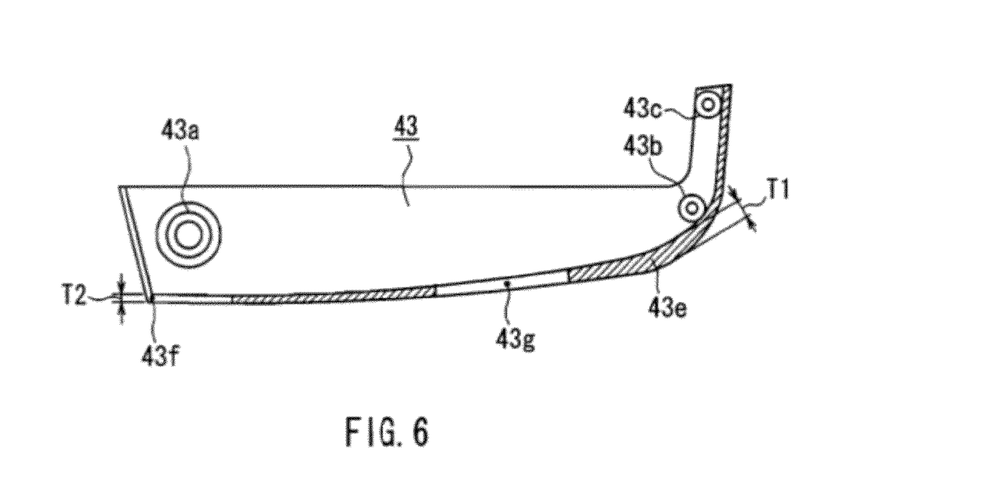
FIG. 6 is a cross-sectional view of the outer case member 43.
Figure 7:
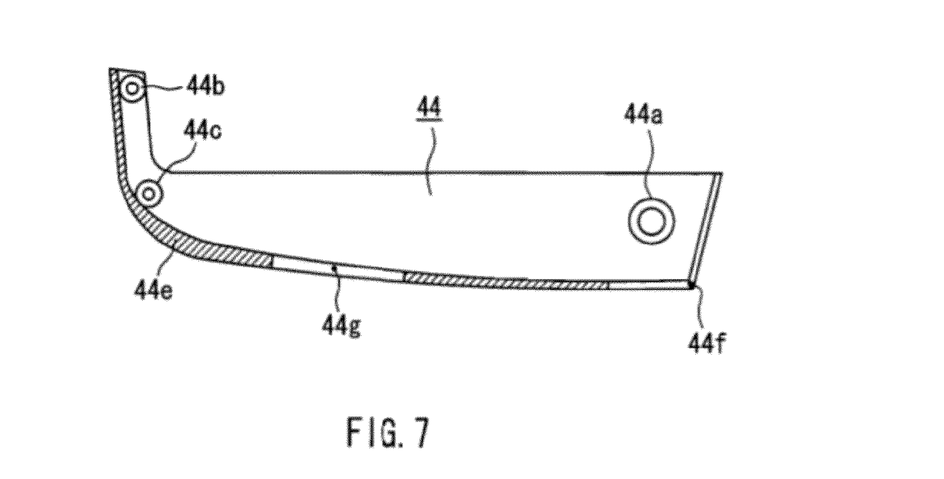
FIG. 7 is a cross-sectional view of the outer case member 44.

In the present embodiment, as shown in FIGS. 6 and 7, the support members 41 and 42 have a larger wall thickness at the corners 41c and 42c for reinforcement than at other portions as described below. FIG. 6 is a cross-sectional view of the outer case member 43 of the support member 41 in a horizontal direction. FIG. 7 is a cross-sectional view of the outer case member 44 in the horizontal direction. As shown in FIGS. 6 and 7, at the portion corresponding to the corner 41c, thick-walled portions 43e and 44e, each having a thickness T1 larger than a thickness T2 in other regions, are formed. With this configuration, even if the corner 41c of the support member 41 comes into contact with the wall or the like, the support member 41 is not broken easily. Further, when the support member 41 is made of a high-strength metal material such as magnesium, it is possible to suppress dents or cracks on the support member 41.

Although not shown in the figures, the corner 42c of the support member 42 also has the same thick-walled portions as above. In FIGS. 6 and 7, openings 43f and 44f form a space for arranging the support portion 4a of the handle 4. Openings 43g and 44g form a space for arranging various operating members such as a slide switch.

[4. Effects etc. of Embodiment]

According to the present embodiment, the support member 41 is arranged continuously from the front surface 1d to the side surface 1b of the first housing 1 in the direction in which the handle 4 is bridged. Further, the support member 42 is arranged continuously from the front surface 1d to the side surface 1c of the first housing 1 in the direction in which the handle 4 is bridged. Thus, the stress applied between the first housing 1 and the handle mechanism when, for example, the user carries the notebook PC holding the handle 4 can be dispersed, so that the handle 4 can be fixed to the first housing 1 with improved strength.

Further, the support members 41 and 42 are provided at the corners of the first housing 1. Thus, even if the corner of the first housing 1 accidentally collides against the wall or the like, the collision impact is absorbed by each of the support members 41 and 42, so that the impact can be made less likely to reach the first housing 1. Further, the support members 41 and 42 absorb the collision impact or may be broken under the collision impact, so that the corners of the first housing 1 become less likely to be deformed or broken. Even if the support members 41 and 42 are broken by the collision, the support members 41 and 42, which are separate from the first housing 1, can be replaced with new support members easily.

Further, the rib 11 of the first housing 1 is sandwiched between the outer case member 43 and the outer case member 44 configuring the support member 41, and the rib 12 of the first housing 1 is sandwiched between the outer case member 45 and the outer case member 46 configuring the support member 42. Further, the ribs 11 and 12 are formed integrally with the first housing 1. Thus, even if the notebook PC is subjected to a force in the torsional direction when, for example, the user carries the notebook PC holding the handle 4, it is possible to make the support members 41 and 42 less likely to be detached from the first housing 1 or broken easily.

Further, in the present embodiment, the support members 41 and 42 have a larger wall thickness at the corners 41c and 42c (corners of the outer case members 43, 44, 45, and 46) than in other regions. Thus, even if the corner 41c or 42c accidentally collides against the wall or the like while the user carries the notebook PC holding the handle 4, it is possible to suppress the breakage of the support member 41 or 42. Further, since it is only necessary to make the wall thickness larger with no increase in the number of components, the strength of the support members 41 and 42 can be enhanced without a great increase in cost.

Although in the present embodiment the support members 41 and 42 are fixed to the first housing 1, they may be fixed to the second housing 2.

Although in the present embodiment the support members 41 and 42 are arranged so that the handle 4 is located at a position opposed to the front surface 1d of the first housing 1, the support members 41 and 42 and the handle 4 may be arranged at other positions.

Although in the present embodiment the thick-walled portions 43e and 44e are provided only in the corners 41c and 42c of the support members 41 and 42, the support members 41 and 42 entirely may be formed to be thick, which results in the same effect.

Further, the rib 11 may not necessarily be formed continuously from the front surface 1d to the side surface 1b of the first housing 1, but is only required to be provided at least on the front surface 1d and the side surface 1b. For example, the rib 11 may be provided individually on each of the front surface 1d and the side surface 1b.

Further, the rib 11 may not necessarily protrude from the side surface 1b. Rather, it is preferable to provide the rib 11 so that the support member 41 fixed to the rib 11 does not protrude from the side surface 1b. To this end, for example, there may be provided a concave portion on the side surface 1b so that the rib 11 can be placed in the concave portion. When the support member 41 is provided so as not to protrude from the side surface 1b, the notebook PC can be put into or taken out of a case such as a bag smoothly because the support member 41 is made less likely to be caught at a corner of the case.

Further, the rib 12 may not necessarily be formed continuously from the front surface 1d to the side surface 1c of the first housing 1, but is only required to be provided at least on the front surface 1d and the side surface 1c. For example, the rib 12 may be provided individually on each of the front surface 1d and the side surface 1c.

Further, the rib 12 may not necessarily protrude from the side surface 1c. Rather, it is preferable to provide the rib 12 so that the support member 42 fixed to the rib 12 does not protrude from the side surface 1c. To this end, for example, there may be provided a concave portion on the side surface 1c so that the rib 12 can be placed in the concave portion. When the support member 42 is provided so as not to protrude from the side surface 1c, the notebook PC can be put into or taken out of a case such as a bag smoothly because the support member 42 is made less likely to be caught at a corner of the case.

Further, the first housing 1 of the present embodiment is an example of the housing of the present invention. The handle 4 of the present embodiment is an example of the handle of the present invention. The support members 41 and 42 of the present embodiment are examples of the support members of the present invention. The front surface 1d of the first housing 1 of the present embodiment is an example of the one side surface of the present invention. The side surfaces 1b and 1c of the first housing 1 of the present embodiment are examples of the other side surfaces of the present invention. The outer case members 43, 44, 45, and 46 of the present embodiment are examples of the outer case members of the present invention. The ribs 11 and 12 of the present embodiment are examples of the ribs of the present invention. The corners 41c and 42c of the present embodiment are examples of the bent portions of the present invention. The liquid crystal display 2a of the present embodiment is an example of the display portion of the present invention. The second housing 2 of the present embodiment is an example of the second housing of the present invention. The shaft provided at the hinge portion 3 of present embodiment is an example of the shaft of the present invention.

The information processing unit of the present invention is useful as a device provided with a handle.

Regarding the present embodiment, the following notes are disclosed.

(Note 1)

An information processing unit includes: a housing that incorporates an information processor; a handle arranged on one side surface of the housing; and support members that are arranged on the one side surface of the housing to protrude and support the handle, wherein the support members respectively are arranged continuously from the one side surface to a pair of other side surfaces adjacent to the one side surface in a direction in which the handle is bridged, and each of the support members has a bent portion between the one side surface and each of the other side surfaces.

(Note 2)

The information processing unit according to Note 1, wherein each of the support members includes a pair of outer case members, the housing includes a rib that protrudes from the one side surface in a direction in which the support members protrude, the rib is formed integrally with the housing, and the pair of outer case members are arranged so as to sandwich the rib therebetween.

(Note 3)

The information processing unit according to Note 2, wherein the rib also protrudes in the direction in which the handle is bridged in a portion on each of the other side surfaces on the one side surface side.

(Note 4)

The information processing unit according to Note 2, wherein the outer case members have a larger wall thickness at the bent portion than at other portions.

(Note 5)

The information processing unit according to any one of Notes 1 to 3, further includes: a second housing provided with a display portion that displays an image based on information processed by the information processor; and a rotation axis about which the housing and the second housing are rotated, thereby assuming a first state in which the housing and the display portion are apart from each other or a second state in which the display portion is located dose to the housing, wherein in the second state, the one side surface side and the bent portion of each of the support members are arranged to protrude relative to a periphery of the second housing.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information processing unit comprising: a housing that incorporates an information processor; a handle arranged on one side surface of the housing; and support members that are arranged on the one side surface of the housing so as to protrude relative to the one side surface and support the handle, wherein the support members respectively are arranged continuously in a wraparound manner from the one side surface to a pair of other side surfaces adjacent to the one side surface in a direction in which the handle is bridged, and each of the support members has a bent portion between a part located on the one side surface and a part for configuring each of the other side surfaces, wherein each of the support members includes a pair of outer case members, the housing includes a rib that protrudes from the one side surface in a direction in which the support members protrude, the rib is formed integrally with the housing, and the pair of outer case members are arranged so as to sandwich the rib therebetween.

2. The information processing unit according to claim 1, wherein the rib also protrudes in the direction in which the handle is bridged in a portion on each of the other side surfaces on the one side surface side.

3. The information processing unit according to claim 2, further comprising:
a second housing provided with a display portion that displays an image based on information processed by the information processor; and
a rotation axis about which the housing and the second housing are rotated, thereby assuming a first state in which the housing and the display portion are apart from each other or a second state in which the display portion is located close to the housing, wherein in the second state, the part located on the one side surface and the bent portion of each of the support members are arranged to protrude relative to a periphery of the second housing.

4. The information processing unit according to claim 1, wherein the outer case members have a larger wall thickness at the bent portion than at other portions.

5. The information processing unit according to claim 1, further comprising:
- a second housing provided with a display portion that displays an image based on information processed by the information processor; and
- a rotation axis about which the housing and the second housing are rotated, thereby assuming a first state in which the housing and the display portion are apart from each other or a second state in which the display portion is located close to the housing, wherein in the second state, the part located on the one side surface and the bent portion of each of the support members are arranged to protrude relative to a periphery of the second housing.

6. The information processing unit according to claim 1, further comprising: a second housing provided with a display portion that displays an image based on information processed by the information processor; and a rotation axis about which the housing and the second housing are rotated, thereby assuming a first state in which the housing and the display portion are apart from each other or a second state in which the display portion is located close to the housing, wherein in the second state, the part located on the one side surface side and the bent portion of each of the support members are arranged to protrude relative to a periphery of the second housing.

* * * * *